3,469,656
Patented Sept. 30, 1969

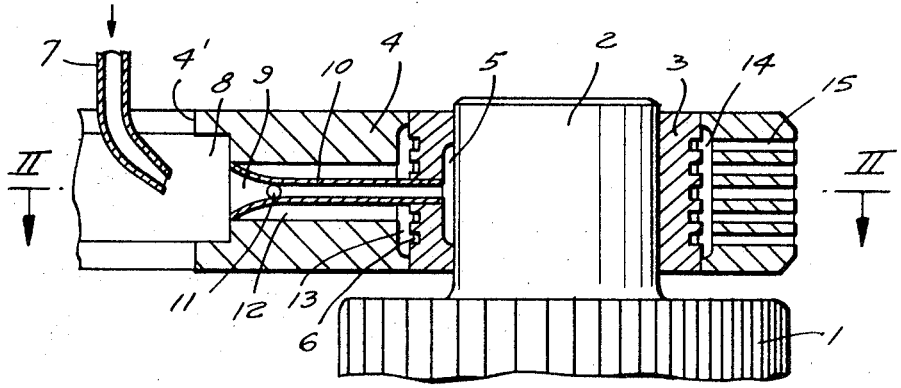
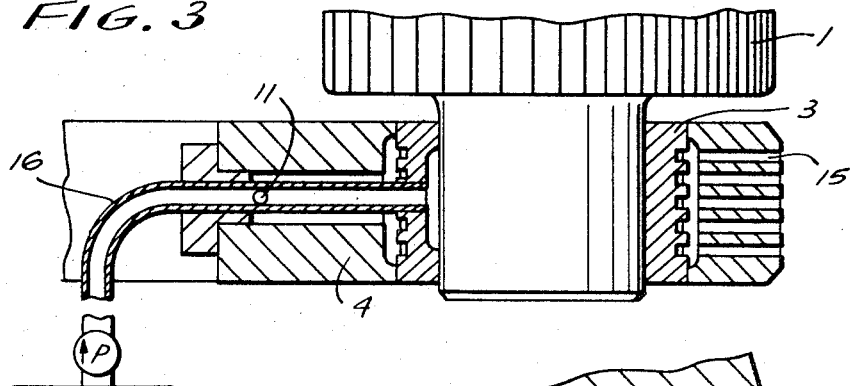
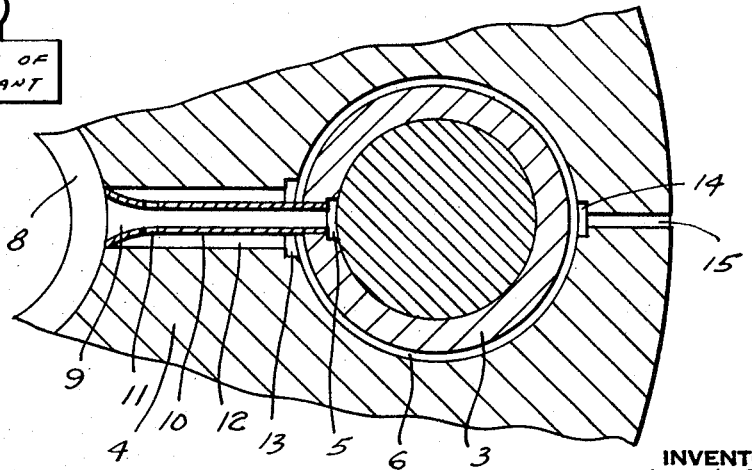

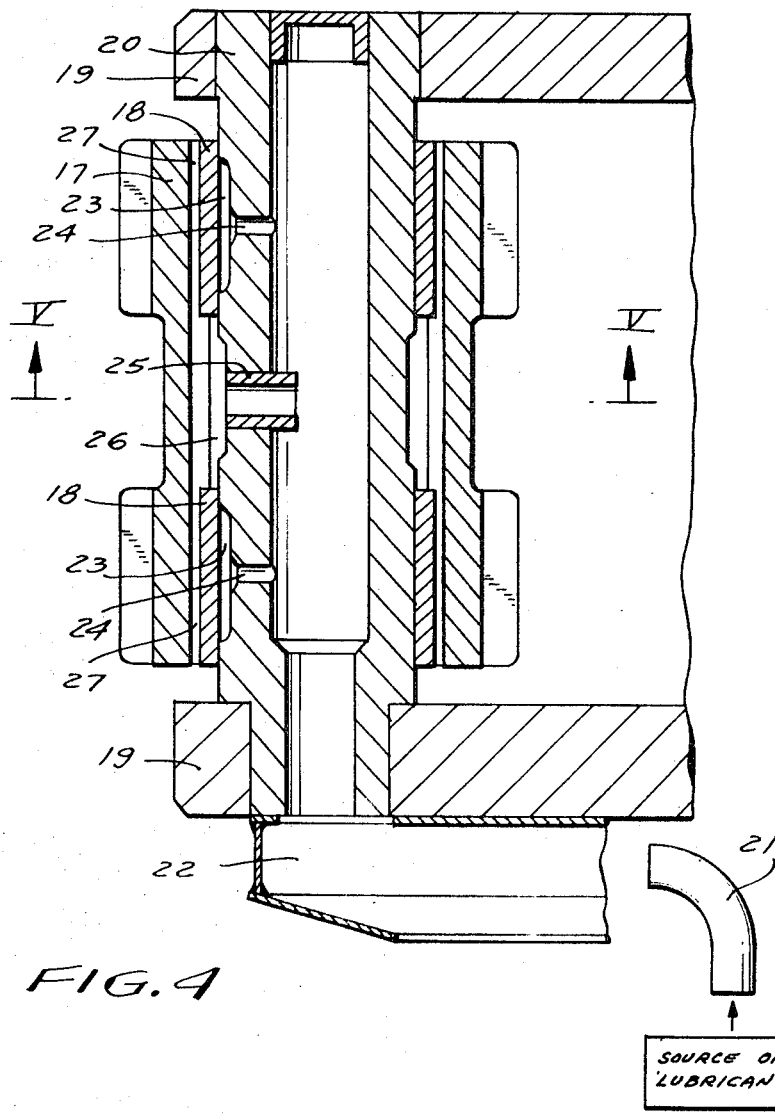

3,469,656
LUBRICATING ARRANGEMENT
Henrich Benthake, Lintorf, Lothar Futterer, Mulheim (Ruhr), and Josef Kunnen, Lank, near Krefeld, Germany, assignors to Rheinstahl Huttenwerke AG., Essen, Germany
Filed Nov. 14, 1966, Ser. No. 594,274
Claims priority, application Germany, Nov. 13, 1965, R 41,980
Int. Cl. F01m 1/00; F16n 17/06; F16c 1/24
U.S. Cl. 184—6          9 Claims

ABSTRACT OF THE DISCLOSURE

A lubricating arrangement has a rotary member journalled in a support. The cylindrical surface of rotation of the rotary member faces a cylindrical first surface of the support in sliding contact therewith and defines with the same a lubricating chamber. The support has a second surface concentric with the first surface and provided with cooling channels having an outlet. A source of lubricant communicates with the lubricating chamber and the cooling channel via conduit means provided for this purpose in such a manner as to supply lubricant firstly to the lubricating chamber and only secondarily to the cooling channels.

---

The present invention relates to lubricating arrangements in general, and more particularly to a lubricating arrangement in which lubricant flowing in a stream from a lubricant source to different points of lubrication is diverted from this stream to respective ones of these points of lubrication in accordance with a predetermined system of priorities.

Although the present invention has a much wider range of applicability, it will hereinafter be described with reference to epicyclic gear trains, and specifically planetary gears, since it is readily understood by having reference to this type of gear train. However, this is not to indicate any limitation of the invention in this sense.

In planetary gear trains, particularly of the type in which the carrier for the planetary gear is itself of rotary construction, the problem of providing sufficient lubricant for lubricating and cooling the surfaces of rotation of the planetary gears supported by the carrier has never been satisfactorily solved heretofore. This problem has been particularly bothersome in arrangements in which a high torque develops at the carrier and in which the planetary gears rotate at high speed. In such instances it was heretofore very difficult to supply adequate quantities of lubricant to the surfaces of rotation, even if the lubricant were fed at relatively high pressure, because of the throttling effect which occurs at the lubricating inlet to the surfaces of rotation. In particular, the lubricant necessary for cooling purposes could never be supplied in adequate quantities. Naturally, this has always had an adverse effect on the performance characteristics of such gears.

Equally naturally, there has long been a need to overcome these disadvantages of the prior art and it is a general object of the present invention to provide a lubricating agent which is capable of meeting with hitherto unfulfilled need.

A more specific object of the present invention is to provide a lubricating arrangement in which lubricant is made available to diverse points of the arrangement in accordance with a predetermined system of priorities.

A still more specific object of the invention is to provide such a lubricating arrangement in which the lubricant is made available at the various points in quantities adequate for lubricating or cooling purposes, depending upon the requirement obtaining at a given point.

A concomitant object of the invention is to provide a lubricating arrangement of type outlined above in which lubricant is made available, in the requisite quantities, to points requiring lubrication as well as to points requiring cooling, but with the points requiring lubrication being supplied with lubricant on a preferential basis.

Yet an additional object of the invention is to so make available the lubricant to the points to be lubricated as well as to the points to be cooled in such a manner that the requisite quantity of lubricant supplied to the points to be cooled does not affect the supply of lubricant to points to be lubricated.

With these and other objects, which will become apparent hereafter, in mind one feature of our invention resides in the position of a lubricating arrangement comprising a rotary member having a cylindrical arrangement comprising a rotary member having a cylindrical surface of rotation, and a support having a cylindrical first surface in sliding contact with the surface of rotation and defining cooling chamber means therewith, said support defining a predetermined axis of rotation for the rotary member and in addition having a second surface concentric with the first surface and provided with cooling channel means having an outlet. My novel lubricating arrangement further includes a source of lubricant and conduit means which communicates with this source and which is so arranged so as to conduct the lubricant from the source to the lubricating chamber means and the cooling chamber means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partially sectioned detail view of a planetary gear comprising one embodiment of the invention;

FIG. 2 is a fragmentary section taken on the line II—II of FIG. 1;

FIG. 3 is a rear view rather similar to that of FIG. 1, but showing a planetary gear comprising another embodiment of the invention;

FIG. 4 is a fragmentary sectional view of another planetary gear comprising a further embodiment of the invention; and FIG. 5 is a fragmentary sectional detail view taken on the line V—V of FIG. 4.

Discussing now the drawing in detail, in which like reference numerals indicate like elements throughout the various figures, and firstly the embodiment shown in FIGS. 1 and 2, it will be seen that the planetary gear is identified with reference numeral 1. The shaft 2 which, as is obvious from the drawing, has an exterior cylindrical surface of rotation, is rotatably received in a bearing 3 which in turn is non-rotatably mounted in the carrier 4. The inner surface of the bearing 3, that is the surface which is in sliding contact with the surface of rotation on the shaft 2 of planetary gear 1, is provided with a lubricant-receiving groove which defines, with the surface of rotation of the shaft 2, a lubricating chamber 5. The radially outermost surface of bearing 3, that is the surface in contact with the carrier 4, is provided with circumferentially extending cooling channels 6, best seen in FIG. 2.

The inner surface of the carrier 4, which faces the outer surface of the bearing 3 in which the cooling channels 6 are provided, is provided with a circumferential recess 13 which is open to the cooling channels 6. The carrier 4 is further formed with a bore 12 which extends from the surface 4' to the recess 13 and communicates with the latter. Received within this bore 12 is a conduit 10 whose inlet end, that is the end which is located adjacent the surface 4' of carrier 4, is flared and whose inner or outlet end extends through a bore which is provided in the bushing 3, and communicates with the lubricating chamber 5. At a predetermined level the conduit 10 is provided with one or more laterally-directed overflow holes 11 which are located, as is evident from FIG. 1, inwardly of the flared inlet end 9 of the conduit 10.

A lubricant-receiving trough 8 is provided at the surface 4' of carrier 4 and communicates with the flared inlet end 9 of conduit 10. A tube, pipe or similar expedient 7 connects the trough 8 with a source of lubricant which is diagrammatically indicated in the drawing.

In operation of the embodiment shown in FIGS. 1 and 2 the lubricant, generally oil, is supplied from the source of lubricant to the trough 8. From there, the lubricant enters into the flared inlet 9 of conduit 10 and flows along the latter under the influence of the centrifugal force which develops on rotation of the carrier 4. From conduit 10 the lubricant flows into the lubricant chamber 5 so that the contacting surfaces of rotation of shaft 2 and bearing 3 are thereby lubricated. It will now be evident that with this arrangement the lubricant chamber 5 is supplied with lubricant on a preferential basis since a flow of the lubricnant from the conduit 10 through the overflow holes 11 into the bore 12 and from there into the recess 13 and the cooling channels 6 cannot take place unless the conduit 10 is filled with lubricant intermediate the innermost overflow hole 11 and the lubricant chamber 5. In other words, the supplying of lubricant to the lubricant chamber 5 is given preferential treatment to assure proper lubrication of the surfaces of rotation at all times and regardless of the quantity of lubricant which is withdrawn from the incoming supply for cooling purposes. On the other hand, an adequate flow of lubricant for cooling purposes to the cooling channels 6 is assured since lubricant is of course constantly fed into the conduit 10 from the trough 8, and since that portion of this lubricant which enters into the cooling channels 6 is removed from the same at a point located substantially diametrically opposite the recess 13. It is evident, particularly from FIG. 1, that at this point there is provided a further recess 14 in the inner face of the carrier 4 and this recess 14 communicates also with the cooling channels 6 so that lubricant which has travelled in these cooling channels from the recess 13 to the recess 14, is collected in the latter and evacuated therefrom by one or more outlet conduits 15. Thus, there is provided a body of lubricant extending from the overflow hole or holes 11 to the outermost ends of the outlet conduits 15 and this body is of course also subject to the action of the centrifugal force so that it is maintained in a constant state of flow with new lubricant constantly being supplied through the overflow hole or holes 11, whereby the bearing 3 is cooled in a highly satisfactory manner.

Coming now to the embodiment shown in FIG. 3 it will be seen that this is substantially similar to that of FIGS. 1 and 2. It differs from the latter only in that the incoming lubricant from the source of lubricant is supplied to the lubricant chamber 5 and the cooling channels 6 not by centrifugal force, but rather by means of a positive feed. To make this possible the trough 8 of FIGS. 1 and 2 is eliminated and a feed conduit 16 replaces the conduit 10. The feed conduit 16 is rigid with the carrier 4 and communicates with a schematically illustrated source of lubricant via a suitable feeding device, here also schematically illustrated as a pump. The manner in which such communication is established, and suitable pumps or other feeding devices are so well known that a description is not thought to be necessary. It is to be noted that in the embodiment of FIG. 3, where the lubricant is of course fed through the feed conduit 16 under pressure, the flow of that portion of lubricant which serves to cool the bearing 3 must be throttled and this can be accomplished in any of the various well known ways at the overflow holes 11 or at the outlet conduits 15, for instance. This embodiment is suitable for stationary as well as for rotary carriers 4.

Coming, finally, to the embodiment illustrated in FIGS. 4 and 5 it will be seen that the arrangement there shown differs from the ones shown in FIGS. 1–3 somewhat more than those differ from each other. Reference numeral 17 designates the planetary gear which is provided with bushings 18 by means of which it rotates about a hollow shaft 20 which is rigid with the carrier 19. The source of lubricant is again schematically illustrated and lubricant passes from there through the inlet conduit 21 into a distributing trough 22. From there, the lubricant flows into the hollow interior of shaft 20 under the influence of centrifugal force. The primary flow of lubricant to the lubricant chambers 23 takes place via bores 24 which are provided for this purpose and which, as is evident from the drawing, communicate with the respective lubricant chambers 23. Only after the lubricant has reached a certain level in the hollow interior of the shaft 20 will a portion of the incoming lubricant pass through the overflow tube 25 into the annular channel 26 from where it moves into the axially extending cooling channels 27 (see also FIG. 5) at whose ends it is evacuated. Rotation of the planetary gear 17 induces in the cooling channels 27 what might be called a pumping action which of course enhances the flow of lubricant through the cooling channels 27.

It will be evident that various modifications of the embodiments herein disclosed are possible without departing in any way from the inventive concept. All of such modifications are of course intended to be encompassed by the appended claims. A listing of these modifications is not believed necessary but it might be pointed out that for instance one such modification could consist in having the cooling channels 27 of the embodiment of FIGS. 4 and 5 extend not axially, but at an inclination to the axis.

From what has been said herein it will be evident that the invention disclosed provides a highly reliable flow of lubricant to the point or points requiring such lubrication, while at the same time a constant flow of requisite quantities of lubricant is directed to such point or points which must be subjected to cooling. In fact, tests have shown that the provision of a coolant flow of predetermined and guaranteed magnitude makes it possible to increase the contact pressure between the surfaces of rotation, a fact which greatly enhances the performance characteristics of constructions using the lubricating arrangement in accordance with the present invention and which in turn favorably affects the physical parameters of units constructed in this manner.

It will be understood that each of the elements described above, or two or more together, may also find a useful application in other types of lubricating arrangements differing from the types described above.

While the invention has been illustrated and described as embodied in a lubricating arrangement for epicyclic gear trains, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A lubricating arrangement, comprising a rotary member having a cylindrical surface of rotation; a support having a cylindrical first surface in sliding contact with said surface of rotation and defining lubricating chamber means therewith, said support defining a predetermined axis of rotation for said rotary member and having a second surface concentric with said first surface and provided with cooling channel means having an outlet; a source of lubricant; and conduit means communicating said source and arranged to conduct lubricant from the latter to said lubricant chamber means and cooling channel means, said conduit means comprising a feed conduit circuit having an outlet end communicating with said lubricating chamber means, and inlet end spaced from said outlet end, and at least one overflow aperture intermediate said ends and communicating with said cooling chamber means, said conduit means further comprising a supply conduit connecting said inlet end with said source of lubricant for supplying a constant flow of lubricant to said feed conduit so that said lubricant fills said lubricating chamber means and thereupon fills said feed conduit at least to said overflow aperture whereupon a constant flow of lubricant ensues therethrough and to said cooling channel means.

2. An arrangement as defined in claim 1; and further comprising pump means for feeding lubricant through said supply conduit into said feed conduit means so that the flow of lubricant to said lubricating chamber means and to said cooling channel means takes place in response to the pressure generated by said pump means.

3. An arrangement as defined in claim 1, wherein said support rotates about a second axis parallel with said predetermined axis of rotation.

4. An arrangement as defined in claim 1, wherein said support rotates about a second axis parallel with said predetermined axis of rotation, and wherein the flow of lubricant to said lubricating chamber means and to said cooling channel means takes place in response to centrifugal forces resulting from rotation of said support.

5. A lubricating arrangement, comprising a rotary member having a cylindrical surface of rotation; a support having a cylindrical first surface surrounding and in sliding contact with said surface of rotation and defining lubricating chamber means therewith, said support defining a predetermined axis of rotation for said rotary member and having an annular second surface concentric with said first surface facing away therefrom and from said surface of rotation, said second surface being provided with cooling channel means having an outlet; a source of lubricant; and conduit means, including a feed conduit having an inlet end and an outlet end communicating with said lubricating chamber means, overflow conduit means communicating with said lubricating chamber means and with said cooling channel means and being arranged so that lubricant in excess of a predetermined quantity will flow from said lubricating chamber means into said cooling channel means, and supply conduit means connecting said inlet end with said source of lubricant, whereby the supplying of lubricant to said lubricating chamber means is given preference over the supplying of lubricant to said cooling channel means.

6. An arrangement as defined in claim 5, wherein said cooling channel means comprises at least one cooling channel concentric with said predetermined axis of rotation.

7. An arrangement as defined in claim 5, wherein said cooling channel means comprises at least one cooling channel elongated in the direction of said predetermined axis of rotation.

8. An arrangement as defined in claim 7, wherein said cooling channel extends parallel to said predetermined axis of rotation.

9. An arrangement as defined in claim 7, wherein said cooling channel extends at an angle to said predetermined axis of rotation.

References Cited
UNITED STATES PATENTS

| | | | |
|---|---|---|---|
| 3,149,890 | 9/1964 | Selby | 308—77 X |
| 3,376,761 | 4/1968 | Stepputtis | 74—801 |

FOREIGN PATENTS

| | | |
|---|---|---|
| 336,410 | 4/1921 | Germany. |
| 339,161 | 7/1921 | Germany. |
| 781,085 | 8/1957 | Great Britain. |

LAVERNE D. GEIGER, Primary Examiner

E. J. EARLS, Assistant Examiner

U.S. Cl. X.R.

184—104; 308—76